March 17, 1925.
H. J. YOUNG
1,530,067
INDICATOR FOR GAUGES
Filed April 21, 1924
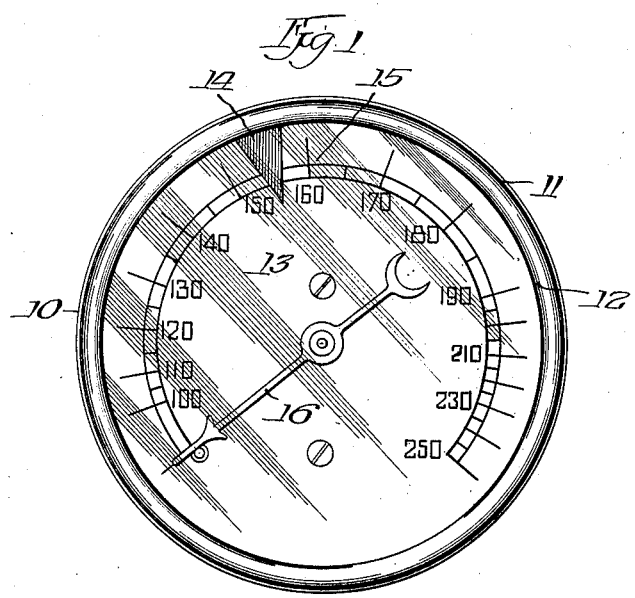
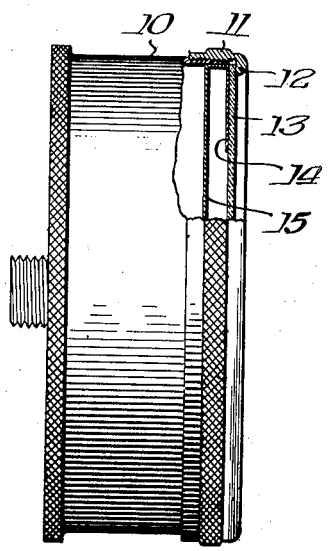
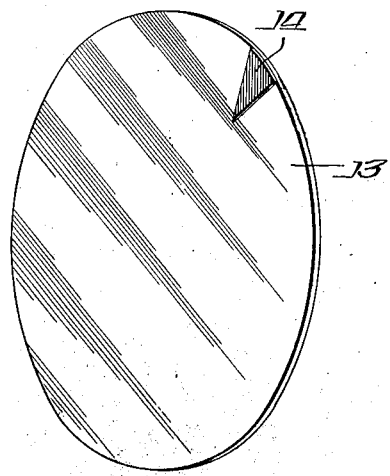
Witness:
Inventor:
Howard J. Young
By Chas. T. Murray, Atty Patented Mar. 17, 1925.

1,530,067

UNITED STATES PATENT OFFICE.

HOWARD J. YOUNG, OF CHICAGO, ILLINOIS, ASSIGNOR TO THE POWERS REGULATOR COMPANY, OF CHICAGO, ILLINOIS, A CORPORATION OF ILLINOIS.

INDICATOR FOR GAUGES.

Application filed April 21, 1924. Serial No. 707,909.

*To all whom it may concern:*

Be it known that I, HOWARD J. YOUNG, a citizen of the United States, and resident of Chicago, in the county of Cook and State of Illinois, have invented certain new and useful Improvements in an Indicator for Gauges, of which the following is a specification.

My invention relates to gauges or thermometers and particularly to a novel attachment for use in connection therewith, adapted as a relatively fixed indicating device.

In the use of gauges or thermometers wherever a movable pointer is employed, it is common to provide an indicating device adapted to be located in a relatively fixed position in order to visually indicate a certain pressure or temperature, usually a limit point. This result is commonly secured by providing a second differently colored pointer having no connection with the indicating mechanism but being manually movable to a desired position, it being intended that it shall remain in that position until the occasion arises for a change in the pre-determined pressure or temperature indicated by the pointer.

An object of my invention is to provide means adapted to accomplish the desired result in a much more economical manner and in which the possibility of confusion between two similarly shaped pointers is avoided. It frequently happens that in a dim light an operator must be able to distinguish the difference between the colors of the two pointers and confusion, if not actual damage, results therefrom. In my device the indicating element cannot be mistaken for the pointer. It consists of a brightly colored, triangular mark applied to the inner face of the cover glass for the instrument. These glasses are usually held in position by means of a screw-cap and by loosening the cap the glass with its attached marker may readily be rotated to a desired point. If thereafter the cap is tightened in place the marker is held in position with certainty and no accidental change is possible.

The invention will be more readily understood by reference to the drawings in which, Fig. 1, is a front elevation of a gauge or thermometer to which my improvement has been applied;

Fig. 2 is a side view thereof with a portion of the casing broken away, and

Fig. 3 is a perspective view showing the manner of application of the marker to the glass cover.

In the drawings, the instrument, which may be any of the common forms of gauges or thermometers, includes a circular casing 10, and a screw-cap 11, having an inwardly extending flange 12, which engages and holds in place the cover glass 13.

Secured to the inner face of the glass and extending inwardly from the periphery thereof is a triangular marker 14, preferably colored red as indicated, which may be composed of paper or may be applied by means of paint. It will be arranged in such relation that the pointed end of the triangle shall, when viewed from the front, cooperate with the calibrations indicated by the scale 15, on the face of the instrument. In Fig. 1 the marker is positioned to indicate a predetermined limit of 155°. An operator therefore will experience no difficulty in observing a definite relation between the pointer 16 of the instrument and the marker 14.

If it be desired to change the position of the marker it is only necessary to loosen the screw-cap 11, and rotate the glass until the marker is in the desired position, thereafter returning the cap to a tight position. Adjustment of the marker is accomplished much more quickly than in the case of a marker in the form of a manually movable pointer, this for the reason that to move the last named device it is necessary to remove the cap and glass from their position on the instrument. As stated, this is unnecessary with my device.

While I have shown the marker as consisting of a separate device secured to the cover glass, I contemplate an alternate construction in which the marker is etched in the glass, or otherwise permanently incorporated therewith. The word "applied", as used in the claims, is therefore intended to cover all the different forms of application of the marker to the glass.

I claim:

1. In a gauge, the comb of a dial having indicia near the periphery thereof, a glass cover plate for the dial, means for holding the glass plate in an adjusted position relative to the dial, and a marker permanently applied to the face of the glass at a point adjacent to the indicia on the dial.

2. In a device of the class described, the combination with an instrument having a dial and a transparent cover for the dial, means permitting rotation of the transparent cover, and a limit marker fixedly secured to and movable with said transparent cover.

3. In a device of the class described, the combination with a casing having a screw-cap, of a glass cover for the dial of said instrument, said cover being held in place by said screw-cap, and a marker fixedly applied to said glass and adapted to be positioned by angular movement of the glass relative to the dial.

Signed at Chicago, Ill., this 14th day of April, 1924.

HOWARD J. YOUNG.